United States Patent [19]
Hartwich

[11] Patent Number: 5,167,387
[45] Date of Patent: Dec. 1, 1992

[54] POROUS AIRFOIL AND PROCESS

[75] Inventor: Peter M. Hartwich, Newport News, Va.

[73] Assignee: Vigyan, Inc., Hampton, Va.

[21] Appl. No.: 735,846

[22] Filed: Jul. 25, 1991

[51] Int. Cl.$^5$ .............................................. B64C 21/02
[52] U.S. Cl. ..................................... 244/200; 244/204
[58] Field of Search ............... 244/198, 200, 204, 209, 244/123, 124, 130

[56] References Cited

U.S. PATENT DOCUMENTS

| | | |
|---|---|---|
| 1,008,630 | 11/1911 | Du Puy .................. 244/200 |
| 1,499,064 | 6/1924 | Kulpers . |
| 1,513,241 | 10/1924 | Harding . |
| 1,613,348 | 1/1927 | Falkenthal . |
| 1,767,944 | 6/1930 | Schleusner . |
| 1,979,184 | 10/1934 | Ziegler . |
| 2,267,927 | 12/1941 | Kightlinger . |
| 2,833,492 | 5/1958 | Fowler . |
| 2,843,341 | 7/1958 | Dannenberg . |
| 2,926,870 | 3/1960 | Schwartz et al. ................. 244/200 |
| 3,097,817 | 7/1963 | Towzey, Jr. .................. 244/209 |
| 3,584,812 | 6/1968 | Brenman . |
| 3,794,274 | 2/1974 | Eknes . |
| 4,114,836 | 9/1978 | Graham et al. ................. 244/130 |
| 4,522,360 | 6/1985 | Barnwell . |
| 4,666,104 | 5/1987 | Kelber ........................... 244/209 |
| 4,736,912 | 4/1988 | Loebert ........................... 244/200 |
| 4,863,118 | 9/1989 | Stallings . |

Primary Examiner—Joseph F. Peters, Jr.
Assistant Examiner—Virna Lissi Mojica
Attorney, Agent, or Firm—Wallace J. Nelson

[57] ABSTRACT

A porous airfoil having venting cavities with contoured barrier walls, formed by a core piece, placed beneath a porous upper and lower surface area that stretches over the nominal chord of an airfoil is employed, to provide an airfoil configuration that becomes self-adaptive to very dissimilar flow conditions to thereby improve the lift and drag characteristics of the airfoil at both subcritical and supercritical conditions.

14 Claims, 3 Drawing Sheets

POROUS AIRFOIL AND PROCESS

ORIGIN OF THE INVENTION

This invention was made with Government support under contract NAS1-18585 awarded by NASA. The Government has certain rights in this invention.

FIELD OF THE INVENTION

This invention relates generally to airfoils and relates specifically to porous airfoils having reduced drag and increased lift properties when compared to solid airfoils of essentially the same configuration and under the same flight conditions.

BACKGROUND OF THE INVENTION

An airfoil can readily be optimized for one set of design constraints consisting of specified values for such parameters as lift, drag, pitching moment, thickness, chord, etc. Achieving this goal for multiple, oftentimes contradictory, sets of design constraints is the objective of the discipline of multi-point design for airfoils. Three basic approaches have, thus far, been employed to achieve multi-point design of an airfoil that will reduce drag and improve lift on a specific airfoil configuration. These approaches have involved (1) determining the contours of a single solid profile from some optimized average of several single point designs, (2) matching multiple design requirements by constructing multi-element wings, and (3) producing an airfoil shape that satisfies several design requirements and to remedy some unwanted flow phenomena with ad-hoc solutions, for example, providing slots to reduce the strength of recompression shocks occurring within a certain narrow speed range.

The first of these approaches can be successfully applied if the design points are sufficiently close spaced together. The second previous approach may cause problems in weight and structure, and sometimes creates new aerodynamic problems in itself due to the need for fairings to accommodate additional gear that must be blended into the overall wing design. The third approach can be useful in fixing a certain aerodynamic problem but usually fails to significantly broaden the operational range of a wing design.

There remains a definite need in the art for an improved airfoil design and process of making same that will satisfy several sets of design constraints over a wide speed range.

Accordingly, it is an object of this invention to provide a new and novel airfoil configuration that becomes self-adaptive to very dissimilar flow conditions, and thus, lends itself to applications in multi-point design for airfoils.

Another object of the present invention is to provide a porous airfoil that vents the airflow flowing over the airfoil to improve the lift and drag characteristics thereof at both subcritical and supercritical conditions.

Another object of the present invention is a process for constructing an airfoil.

Still another object of the present invention is an airfoil having cavities beneath porous upper and lower surfaces.

A still further object of the present invention is a process for making airfoils self-adaptive to dissimilar flow conditions.

Another object of the present invention is a new and novel design process for developing aerodynamic wing designs.

SUMMARY OF THE INVENTION

According to the present invention, the foregoing and additional objects of the present invention are attained by placing cavities with contoured barrier walls, formed by a core piece, beneath a porous upper and lower surface patch that stretches over the nominal chord of an airfoil. These cavities permit the high pressures occurring in the nose and trailing edge regions to be vented toward the zones of relatively low pressure in the mid-section of the airfoil. This venting leads to inflow into the airfoil in the nose region which effectively reduces the nose radius. Further downstream along the porous airfoil, the venting process leads to recirculation bubbles that displace the enveloping streamlines and thereby shift the effective position of maximum thickness further aft while increases its magnitude. The magnitude of these modulations of the flow field in the vicinity of a profile depend on the angle of attack, the degree of porosity, free stream Mach number and the shape of the baseline airfoil.

BRIEF DESCRIPTION OF THE DRAWINGS

A more complete appreciation of the invention and many of the attendant advantages thereof will become more apparent as the same becomes better understood by reference to the following drawings wherein.

DETAILED DESCRIPTION

Figure 1:
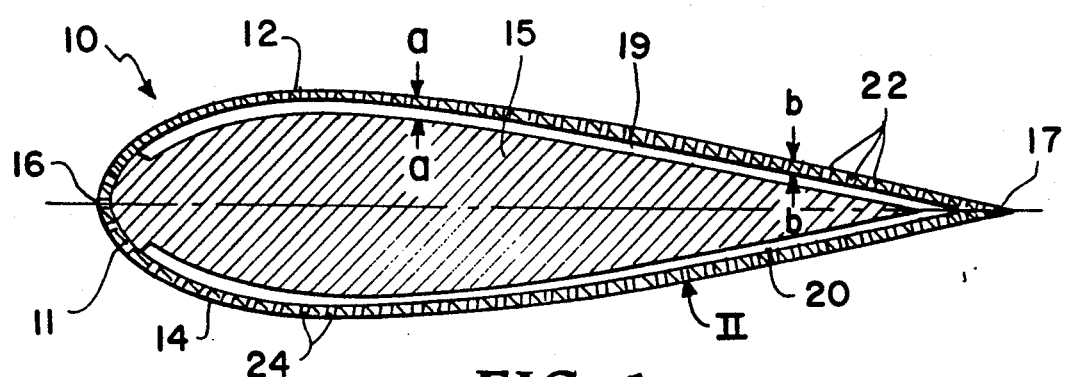
FIG. 1 is a sectional view of an exemplary porous airfoil according to the present invention.
Figure 1A:
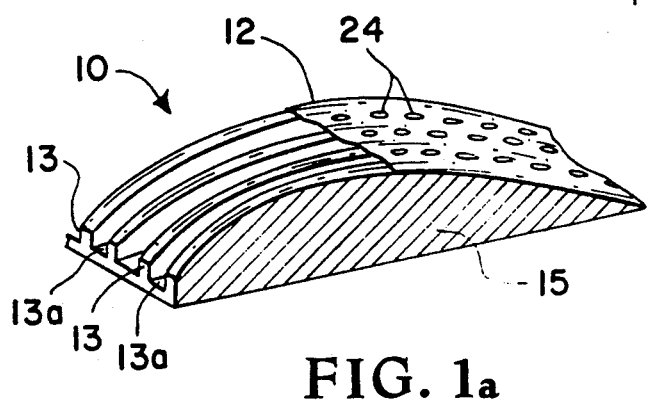
FIG. 1a is a partial, perspective view of the airfoil shown in FIG. 1 with portions of the top airfoil skin broken away to illustrate the rib support structure therefor.

Referring now to the drawings and more particularly to FIG. 1, there is shown a porous airfoil according to the present invention and designated generally by reference numeral 10. Airfoil 10 is provided with an external skin or outer layer 11 having a porous top wall surface 12 and a porous bottom wall surface 14. A barrier wall or core piece 15 extends chordwise along the entire chord of airfoil 10. A forward portion of barrier wall 15 is provided with an arcuate contour and serves as support for skin 11 at the leading edge portion 16 of airfoil 10. The aft portion of barrier wall 15 tapers to a sharp edge and serves to support skin 11 at the trailing edge 17 of airfoil 10. Top porous wall 12 and bottom porous wall 14 are of identical construction and are continuations of skin 11 and integrally secured to barrier wall 15 at the respective leading and trailing edges 16, 17 thereof. Except for the attachment points at the leading and trailing edge surfaces, top porous wall surface 12 and bottom wall surface 14 are spaced from barrier wall 15 to thereby form separate cavities 19,20 between barrier wall and the respective porous top and bottom wall surfaces 12,14. Suitable spars or ribs 13 (FIG. 1a) extend along the chord of airfoil 10 for support and attachment of skin 11 thereto at spaced intervals along the airfoil span, as will be further explained hereinafter. A trough 13a, formed between each pair of ribs 13, constitutes the cavities 19 between barrier wall 15 and top porous top wall surface 12. Identical ribs and troughs (not shown) are provided as support for bottom wall surface 14 and serve to form cavities 20 between barrier wall 15 and bottom wall surface 14.

Cavities 19,20 are each of substantially equal depth and extend from the exterior surface of respective top and bottom surfaces 12, 14 through the respective pores 22,24 therein to the surface of barrier wall 15, as indicated by arrow pair a—a. The depth of cavities 19,20, or the distance between arrows a—a, would normally be in the range of one and one-half to three percent of the chord. Barrier wall or core piece 15 in the illustrated embodiment is shown as constructed of solid material. While this is a suitable design for a wind-tunnel model, airfoil designs for flight vehicles would normally use some lightweight construction involving honeycomb, spars, struts, or the like. The entire skin 11, including top wall surface 12 and bottom wall surface 14, is of uniform thickness, as indicated by arrow pair b—b for top wall 14. The thickness for these surfaces 12,14 would normally be in the range of 0.010 to 0.020 inch.

Figure 2:
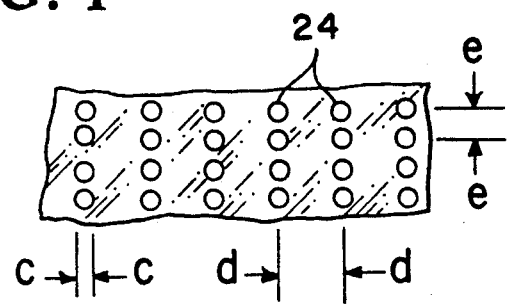
FIG. 2 is a plan view of a portion of one of the porous surfaces of the airfoil shown in FIG. 1 as seen looking in the direction of arrow II.

Referring to FIG. 2, a plan view of a portion of bottom wall surface 14 is shown as seen looking in the direction of arrow II of FIG. 1. This view illustrates one exemplary bore diameter size, bore arrangement, and the spacing between individual bores 24. As shown therein, the diameter of each individual bore 24 is designated by arrow pair c—c, while the chordwise spacing between individual adjacent bores is designated by arrow pair e—e. The spanwise spacing between individual adjacent rows of bores 24 is designated by arrow pair d—d. All bores 24 in a specific configuration are normally of equal diameter (c—c), and in the range of 0.0025 to 0.010 inch. The distance between arrows e—e, or the minimum chordwise spacing between individual bores 24 is within the range of 0.0050 to 0.025 inch, while the distance between arrows d—d or the spanwise spacing between adjacent rows of bores 24 is in the range of 0.10 to 0.20 inch. Depending on a particular choice for skin thickness, bore diameter, chordwise and spanwise spacing of the bores, the geometric porosity (i.e., the total hole area versus the airfoil surface area) ranges from 2.5 to 10 percent.

The bore size, spacing between the rows and spacing between adjacent bores would normally be the same in both the top and bottom wall surfaces in a specific airfoil 10.

Figure 3:
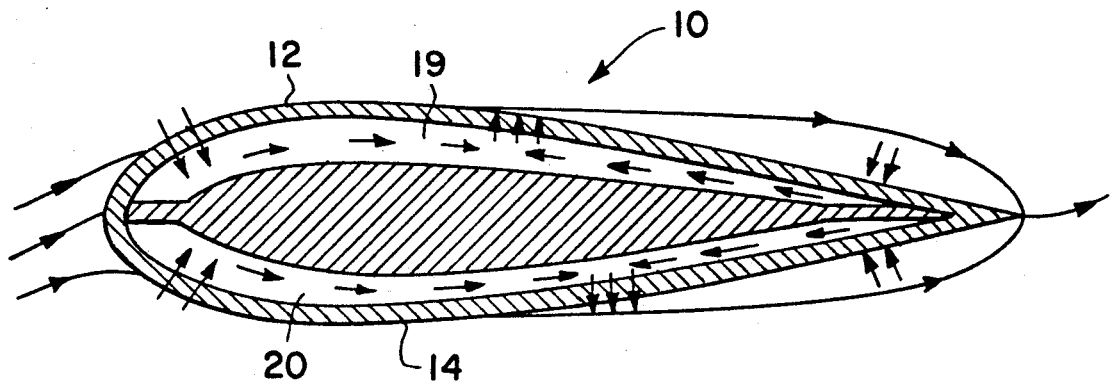
FIG. 3 is a somewhat schematic sectional view of the airfoil shown in FIG. 1 exaggerating the cavity depth to illustrate the venting technique created by the present invention.

Referring now to FIG. 3, a schematic representation of the venting of the air flow through cavities 19,20 is shown. As denoted by the arrows, the high pressure air flow at the leading edge or nose portion 16 of airfoil 10 enters cavities 19,20 and is vented toward, and exits at the zones of relative low pressure in the midsection of airfoil 10. This venting technique leads to inflow into airfoil 10 in the nose or leading edge region 16 to effectively reduce the airflow nose radius. Further downstream along porous airfoil 10, the venting process leads to recirculation bubbles which exit airfoil 10 at substantially the mid-chord section thereof and serve to displace the enveloping streamlines of the airflow about airfoil 10. This shifts the effective position of the airfoil maximum thickness further aft and increases its magnitude, as will be more clearly explained hereinafter. The magnitude of these modulations of the flow field in the vicinity of a specific airfoil profile 10 depend on the airfoil angle of attack, the degree of porosity, the free stream Mach number and the shape of the baseline airfoil.

In a computational pilot study of the present invention, the Euler equations were solved for transonic flow ($0.63 \leq M_\infty \leq 0.8$, $0° \leq \alpha \leq 2°$) over the known NACA 0012 airfoil and over supercritical airfoils with solid, as well as porous surfaces. The porous surfaces studied were as illustrated in FIG. 1 with the porous top wall 12 and bottom wall 14 surfaces stretching over the entire airfoil chord between nose leading edge 16 and trailing edge 17, and with cavities 19,20 disposed beneath the top and bottom surfaces 12,14.

Figure 4:
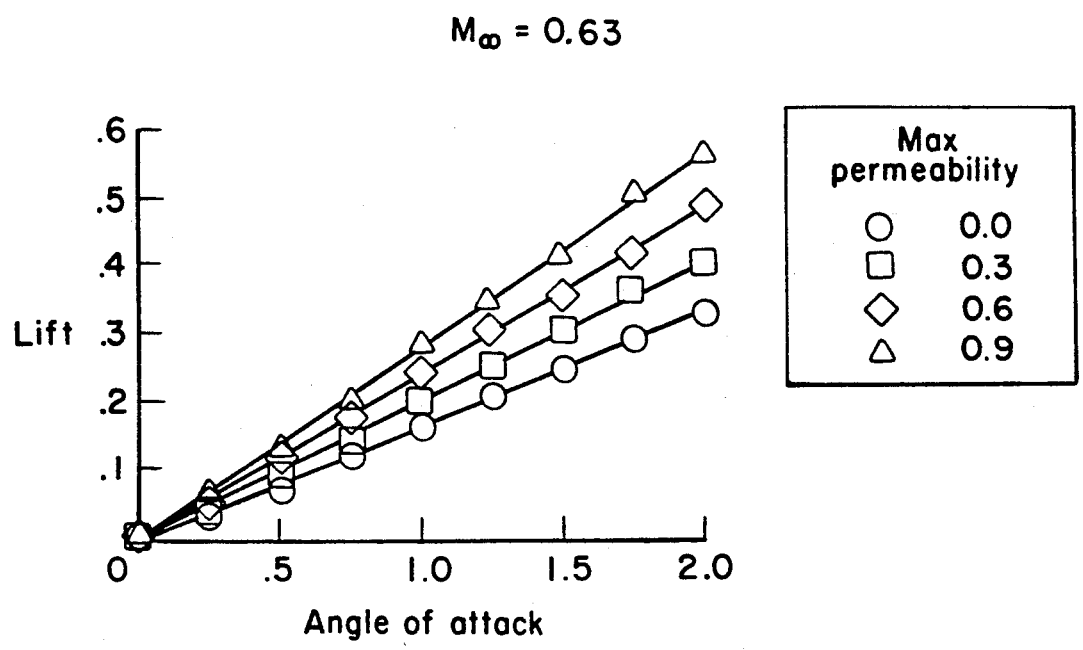
FIG. 4 is a graphic comparison showing the effect of porosity on lift versus angle of attack for subcritical flow past a specific airfoil.
Figure 5:
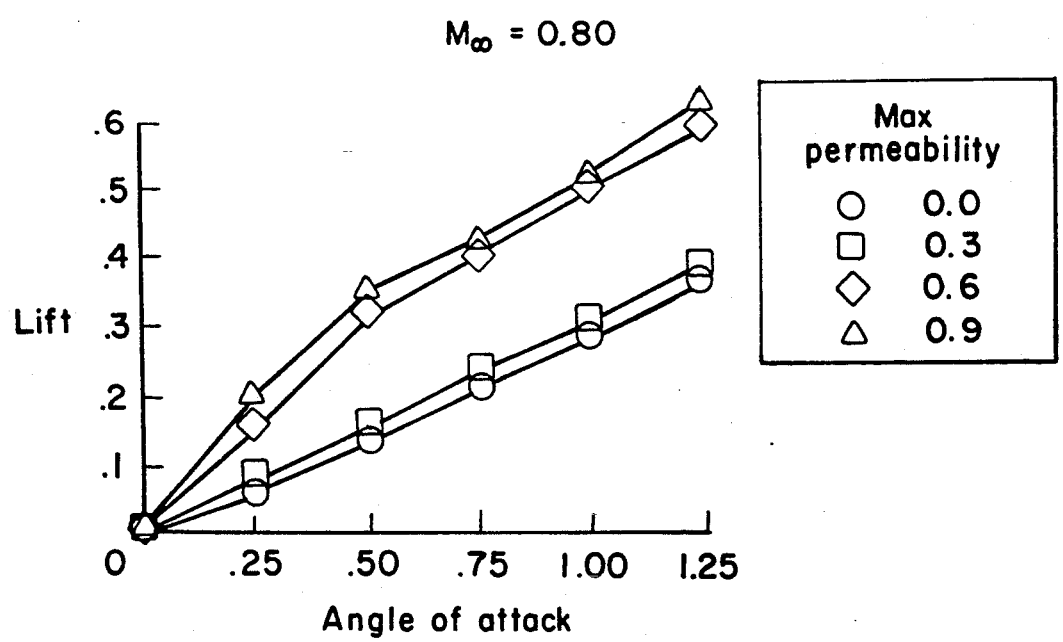
FIG. 5 is a graphic comparison similar to FIG. 4 illustrating the effect of porosity on lift versus angle of attack for supercritical flow past the same airfoil.

FIGS. 4 and 5 graphically demonstrate that porosity applied to a NACA 0012 airfoil configuration dramatically increases lift for both subcritical ($M_\infty = 0.63$, FIG. 4) and supercritical ($M_\infty = 0.80$, FIG. 5) air flow.

Figure 6:
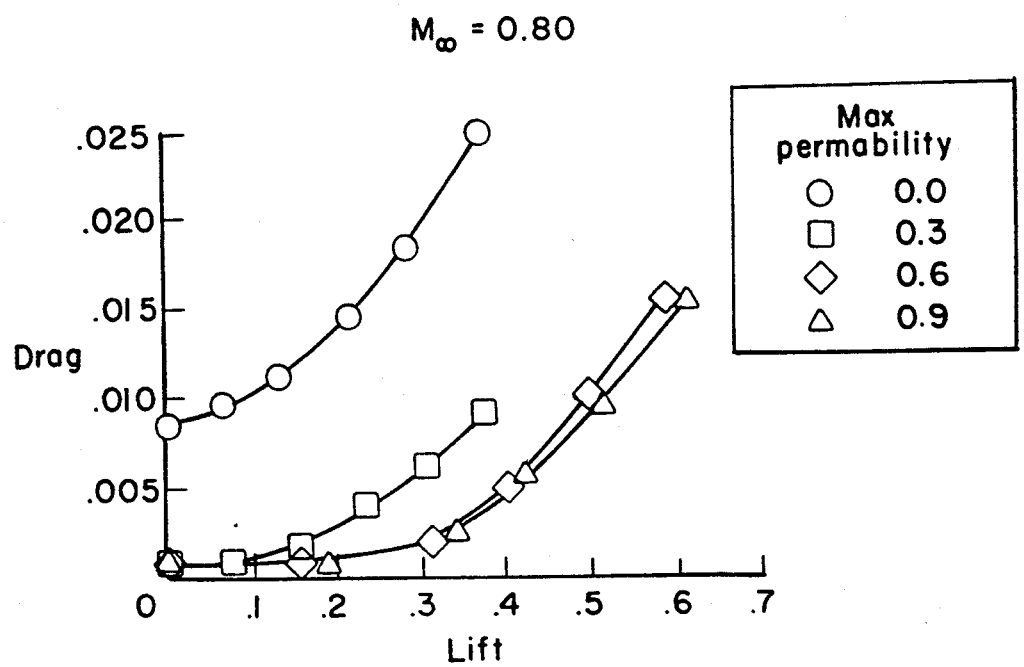
FIG. 6 is a graphic comparison by means of drag polars demonstrating the effect of porosity on the same airfoil and at the Mach number employed in the illustration of FIG. 5.

As indicated by the drag polars in FIG. 6, the wave drag taken at constant lift for supercritical flow past a porous NACA 0012 profile is up to one order of magnitude lower than for its solid counterpart. This phenomenon occurs for $\infty \leq 0.5°$ where, for any fixed angle of attack, porosity of the present invention leads to additional lift without any apparent increase in wave drag, as graphically shown in FIG. 6.

Figure 7:
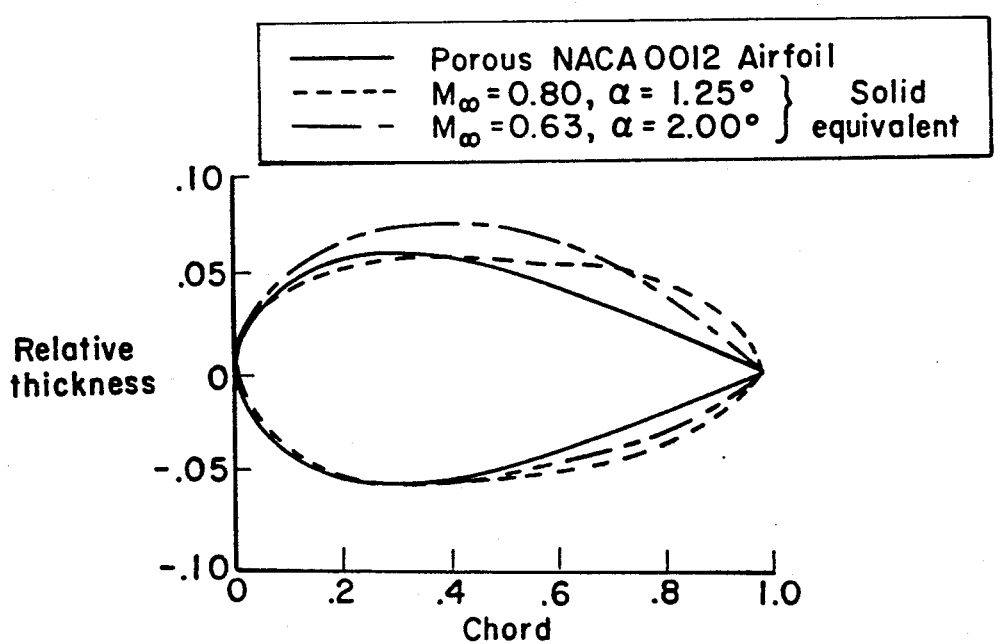
FIG. 7 is a schematic illustration of the relative thickness versus chord of the self-adaptive airfoil effect utilizing the porosity of the present invention to effectively obtain different shape solid airfoil results at two selected Mach numbers and angles of attack.

Referring now to FIG. 7, an illustration of the novel self-adaptive capability, or responsiveness to dissimilar flow conditions of a porous NACA 0012 configured airfoil constructed in accordance with the present invention, is shown. Using the calculated porous surface pressure distribution as target pressures, equivalent solid airfoil shapes were constructed using a computational design tool. As illustrated in this FIG., the subcritical equivalent airfoil basically retains the drop shape of the NACA 0012 profile, while it has become thicker and asymmetric. Thus, incidence as well as camber constitute the lift of the porous variant of the NACA 0012 airfoil whereas for a solid NACA 0012 airfoil, incidence is the sole lift producing mechanism. The supercritical companion piece reveals a distinct flattening of the upper surface combined with a hump-shaped closure towards the trailing edge, typical for high-speed airfoils.

The effectiveness of porosity has also been demonstrated for an already optimized supercritical airfoil wherein, a specific porous surface in combination with separate top and bottom cavities to promote airflow venting, leads to an expansion of the operational Mach number and incidence range. In general, it may be said that by employing the teachings of the present invention to make airfoils self-adaptive to dissimilar flow conditions, an entirely new area in aerodynamic wing design is created.

Although the invention has been described relative to specific embodiments thereof, it is not so limited and there are numerous modifications and variations thereof that will be readily apparent to those skilled in the art in the light of the above teachings. For example, cavities 19 and 20 could be of diverse depth, one or both could be varied along the chord, or otherwise within the scope of the invention. Also, the exterior configuration of barrier wall or core piece 15 could be provided with different contours to tailor the flow in cavities 19,20 to specific design requirements.

Skin 11 forming top and bottom wall surfaces 12 and 14 is conventionally constructed of suitable thin, lightweight metal such as aluminum, aluminum alloys, titanium, or the like, that inherently have some degree of flexibility. These walls, as well as the inner core piece 15, could be constructed of different gauge sheet metal or other flexible materials to satisfy specific design goals. In addition, the area of the porous surfaces may be divided into specific patches or zones with single or multiple cavities being provided for the various porous patches to provide additional control mechanisms. Also, the individual bores constituting a specific porous surface may be of diverse diameters, the rows thereof may be uniform or staggered and the spacing between individual bores in the same or different zones may be varied for additional controls. Active blowing or suction may also be employed to provide an additional means of manipulating the flow of porous airfoils. Also, the porous surfaces may be confined to either the top or bottom of the airfoil in some instances.

These and other modifications and variations of the invention will appear obvious to those skilled in the art in the light of the above teachings.

It is therefore to be understood that within the scope of the appended claims, the invention may be practiced other than as specifically described herein.

What is claimed as new and desired to be secured by Letters Patent of the United States is:

1. An airfoil device comprising:
a thin skin surface layer completely covering an airfoil and forming a top and a bottom airfoil surface;
at least one of said top and said bottom airfoil surfaces being formed of a porous thin skin material;
a barrier wall disposed internally of said at least one of said top and said bottom airfoil surfaces;
said barrier wall extending along a chord of said airfoil and having an arcuate contoured portion thereof abutting said thin skin material at the leading edge and a tapered sharp edge portion of said barrier wall abutting the trailing edge of said airfoil and portions of said barrier wall disposed between said arcuate contoured portion and said tapered sharp edge portion thereof being spaced from said at least one of said top and said bottom airfoil surfaces to provide at least one cavity extending chordwise between said barrier wall and said at least one top and said bottom airfoil surfaces.

2. The airfoil of claim 1 wherein both of said top and said bottom airfoil surfaces are formed of porous thin skin metal material and provided with a plurality of equal diameter bores therethrough, said equal diameter bores being disposed in a specific pattern on each of said top and said bottom surfaces and the diameter of each of said equal diameter bores being in the range of 0.005 to 0.025 inch.

3. The airfoil of claim 1 wherein both of said top and said bottom airfoil surfaces are formed of a porous thin skin material, each of said top and said bottom airfoil surfaces being spaced at a specific and identical distance from said barrier wall along the chord of said airfoil between said arcuate contoured portion and said tapered sharp edge portion, and each of said top and said bottom surfaces being provided with a plurality of bores therethrough and arranged in a linear row along the chord of said airfoil.

4. The airfoil of claim 3 including a plurality of spaced ribs extending chordwise between said barrier wall portion disposed between said arcuate contoured portion and said tapered sharp edge portion and each of said top and said bottom airfoil surfaces and said plurality of spaced ribs serving as support for said top and said bottom airfoil surfaces.

5. The airfoil of claim 4 wherein said spaced ribs are positioned between adjacent linear rows of said plurality of bores and the spacing between said ribs constitute troughs extending along the chord of said airfoil to serve as cavities between said barrier wall and said top and said bottom airfoil surfaces.

6. A method of making an improved airfoil, comprising the steps of:
providing an inner core element for an airfoil having a rounded nose section extending along the span of said core element to serve as the leading edge for the airfoil and a sharp edge section opposite to the rounded nose section to serve as the trailing edge for the airfoil;
securing a plurality of ribs spaced along the chord of upper and lower surfaces of the inner core to thereby provide a chord extending trough or channel between each pair of adjacent spaced ribs;
providing a thin skin metal material having multiple bores therethrough and at least a portion of the thin skin material having multiple bores being arranged in a plurality of linear rows;
encasing the inner core element with the thin skin metal material;
positioning the thin skin metal material over the inner core element to locate the plurality of linear rows of multiple bores over a portion of the upper and bottom surface areas of the inner core element such that the spacing between adjacent rows are aligned chordwise with the ribs and the linear rows of multiple bores are aligned chordwise with the troughs or channels formed between each adjacent pair of spaced ribs;
securing the thin skin metal material to the leading edge and trailing edge portions of the inner core element and to the chord extending ribs on both the upper and lower surfaces thereof to thereby convert the troughs or channels to chord extending cavities between the inner core element and the thin skin surface layer.

7. An airfoil structure comprising in combination:
an airfoil;
a thin skin layer completely covering said airfoil and having portions thereof forming the leading edge surface, the trailing edge surface and top and bottom wall surfaces of said airfoil;
at least one of said top and said bottom wall surfaces being porous and having a geometric porisity in the range of 2.5 to 10 percent;
an inner core element extending chordwise along a chord of said airfoil;

said inner core element having a rounded tip extending along the span and being attached to and serving as support for the leading edge of said thin skin layer on said airfoil;

said inner core element having a sharp trailing edge opposite to said rounded tip;

said sharp trailing edge of said inner core element extending along the span of and being attached to and serving as support for the trailing edge of said airfoil; and said at least one of said top wall and said bottom wall surfaces having portions thereof spaced from said inner core element along the chord thereof to thereby form at least one cavity between said at least one of said top and said bottom wall surface and said inner core element.

8. The airfoil structure of claim 7 including a plurality of spaced ribs disposed on said inner core element and attached to and serving to support and maintain said portions of said at least one of said top wall and said bottom wall surfaces spaced from said inner core element along the chord thereof, and a channel extending along the chord of said airfoil between each two adjacent spaced ribs and serving as said at least one cavity between said at least one of said top and said bottom wall surface and said inner core element.

9. The airfoil structure of claim 7 wherein portions of both said top and said bottom wall surfaces are porous and including a plurality of spaced ribs disposed on said inner core element and attached to and serving to support and maintain both said top wall and said bottom wall portions that are spaced from said inner core element along the chord thereof, and a channel extending along the chord of said airfoil between each two adjacent spaced ribs and serving to provide cavities along the chord between both said top and said bottom wall surfaces and said inner core element.

10. The airfoil structure of claim 9 wherein said porous top and bottom wall surfaces are provided with multiple bores therein, said multiple bores each having a diameter in the range of 0.0025 to 0.010 inch and being arranged in linear rows disposed at least one each between said adjacent spaced ribs and over one of said channels to thereby permit airflow to enter through said top and said bottom wall surfaces into said cavities in said airfoil wherein air flows through said porous top and said porous bottom wall surfaces into and out of said cavities formed between said top and said bottom porous walls and said inner core element to thereby improve the lift and drag flight properties of the airfoil over that of a solid airfoil of identical configuration.

11. The method of making an improved airfoil as in claim 6 wherein the thickness of the thin skin metal material is in the range of 0.010 to 0.020 inch and the depth of the cavities formed between the inner core element and the thin skin surface layer is in the range of one and one-half to three percent of the chord distance.

12. The method of making an improved airfoil as in claim 6 wherein the diameter of each of the multiple bores in the thin skin metal material is in the range of 0.0025 to 0.010 inch, the minimum spacing between individual adjacent bores along the airfoil chord and in the same linear row is in the range of 0.005 to 0.025 inch, and the spanwise distance between adjacent linear rows of the bores is in the range of 0.10 to 0.20 inch.

13. The method of making an improved airfoil as in claim 6 wherein the geometric porosity of the airfoil is in the range of 2.5 to 10 percent.

14. The method of making an improved airfoil as in claim 6 wherein the width of the individual ribs at the point of attachment thereof to the thin skin metal material is essentially the same as the spanwise distance between adjacent linear rows of the bores or in the range of 0.10 to 0.20 inch.

* * * * *